(12) United States Patent
Nagaratnam et al.

(10) Patent No.: US 12,267,421 B2
(45) Date of Patent: Apr. 1, 2025

(54) POST QUANTUM SECURE INGRESS/EGRESS NETWORK COMMUNICATION

(71) Applicant: International Business Machines Corporation, Armonk, NY (US)

(72) Inventors: Nataraj Nagaratnam, Cary, NC (US); Martin Schmatz, Zurich (CH); Navaneeth Rameshan, Zurich (CH); Vaijayanthimala K. Anand, Austin, TX (US); Jeffrey J. Feng, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 17/451,312

(22) Filed: Oct. 18, 2021

(65) Prior Publication Data

US 2023/0119304 A1    Apr. 20, 2023

(51) Int. Cl.
*H04L 9/08* (2006.01)
*H04L 9/30* (2006.01)
(Continued)

(52) U.S. Cl.
CPC ............ *H04L 9/0855* (2013.01); *H04L 9/302* (2013.01); *H04L 9/3066* (2013.01); *H04L 67/133* (2022.05); *H04L 67/563* (2022.05)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS 5,764,765 A * 6/1998 Phoenix ............... H04L 9/0858
 380/256
6,748,083 B2 * 6/2004 Hughes ............... H04L 9/0858
 380/278

(Continued)

FOREIGN PATENT DOCUMENTS

CN   103338187 A   10/2013
CN   108111301 A   6/2018
(Continued)

OTHER PUBLICATIONS

Mell et al., "The NIST Definition of Cloud Computing", Computer Security Division, National Institute of Standards and Technology, Jan. 2011, 7 pages.

*Primary Examiner* — Sharif E Ullah
(74) *Attorney, Agent, or Firm* — Yee & Associates, P.C.

(57) ABSTRACT

Post quantum secure network communication is provided. The process comprises sending, by a client in a first computing cluster, an outbound message to a quantum safe cryptographic (QSC) proxy server in the first computing cluster, wherein the outbound message is addressed to a target server in a second computing cluster. The QSC proxy server initiates a QSC transport layer security (TLS) connection with an ingress controller in the second computing cluster, wherein the ingress controller comprises a QSC algorithm. The QSC proxy server transfers the message to the ingress controller via the QSC TLS connection, and the ingress controller routes the message to the target server in the second computing cluster via a non-QSC connection.

17 Claims, 6 Drawing Sheets

(51) Int. Cl.
*H04L 67/133* (2022.01)
*H04L 67/563* (2022.01)

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ................ 380/255, 264, 276; 726/2, 21, 36; 713/150, 163, 181
See application file for complete search history.

(56) References Cited

U.S. PATENT DOCUMENTS

| | | | | |
|---|---|---|---|---|
| 7,178,277 | B2* | 2/2007 | Takeuchi | H04L 63/062 380/263 |
| 7,437,081 | B2* | 10/2008 | Mitchell | H04B 10/70 398/154 |
| 8,855,316 | B2* | 10/2014 | Wiseman | H04L 9/0855 380/278 |
| 9,960,465 | B2* | 5/2018 | Dudley | H01M 50/204 |
| 10,057,058 | B2* | 8/2018 | Murakami | H04L 9/0858 |
| 10,581,604 | B2* | 3/2020 | Mustafa | H04L 9/302 |
| 11,121,878 | B2* | 9/2021 | McCarty | H04L 9/3213 |
| 11,892,746 | B1* | 2/2024 | Mazed | G02F 1/212 |
| 2005/0138352 | A1* | 6/2005 | Gauvreau | H04L 9/3247 713/153 |
| 2007/0065154 | A1* | 3/2007 | Luo | H04J 14/0282 398/141 |
| 2007/0076884 | A1* | 4/2007 | Wellbrock | H04L 9/0855 380/263 |
| 2007/0195774 | A1* | 8/2007 | Sherman | H04L 69/16 370/392 |
| 2011/0206204 | A1* | 8/2011 | Sychev | H04J 14/06 380/256 |
| 2011/0213979 | A1* | 9/2011 | Wiseman | H04L 9/0844 713/171 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2016/0241396 | A1* | 8/2016 | Fu | H04L 9/0836 |
| 2016/0359626 | A1* | 12/2016 | Fu | H04L 9/0858 |
| 2016/0366094 | A1* | 12/2016 | Mason | H04L 61/5038 |
| 2017/0214525 | A1* | 7/2017 | Zhao | H04W 12/0431 |
| 2017/0230173 | A1* | 8/2017 | Choi | H04L 9/0861 |
| 2018/0115523 | A1* | 4/2018 | Subbarayan | G06N 20/00 |
| 2018/0176091 | A1* | 6/2018 | Yoon | H04L 43/0888 |
| 2019/0036821 | A1* | 1/2019 | Levy | G06F 12/0868 |
| 2019/0319796 | A1* | 10/2019 | Ghosh | H04L 9/3236 |
| 2019/0319804 | A1* | 10/2019 | Mathew | G09C 1/00 |
| 2019/0349392 | A1* | 11/2019 | Wetterwald | H04L 43/0852 |
| 2020/0084222 | A1* | 3/2020 | William | H04L 63/12 |
| 2021/0374585 | A1* | 12/2021 | Ramanathan | G06N 5/02 |
| 2021/0374761 | A1* | 12/2021 | Ramanathan | G06Q 30/018 |
| 2021/0374862 | A1* | 12/2021 | Ramanathan | G06N 5/01 |
| 2023/0023529 | A1* | 1/2023 | Jenkins | H04L 9/0631 |

FOREIGN PATENT DOCUMENTS

| | | |
|---|---|---|
| CN | 112039670 A | 12/2020 |
| CN | 112118098 A | 12/2020 |
| EP | 3562115 A1 | 10/2019 |

* cited by examiner

POST QUANTUM SECURE INGRESS/EGRESS NETWORK COMMUNICATION

BACKGROUND

1. Field

The disclosure relates generally to secure communications and more specifically to secure post quantum communication both between and within computer clusters in a cloud application platform.

2. Description of the Related Art

As quantum computing continues to evolve and advance, a large quantum computer will be able to run a Shor algorithm that can break current safe transport layer security (TLS) algorithms such as elliptical-curve cryptography (ECC) and Rivest-Shamir-Adleman (RSA) in a matter of minutes. Because data has a long shelf life and value, any TLS data-in-transit that has been snooped and stored might be breached at a later time when larger quantum computers become available.

Quantum safe cryptography (QSC), also known as post quantum cryptography, is a new generation of the public-key infrastructure (PKI) cryptographic system. QSC employs algorithms based on mathematical problems that even large quantum computers cannot break. Post quantum safe cryptographic algorithms are under evaluation but not yet standardized.

SUMMARY

An illustrative embodiment provides a computer-implemented method for post quantum secure network communication. The method comprises sending, by a client in a first computing cluster, an outbound message to a quantum safe cryptographic (QSC) proxy server in the first computing cluster, wherein the outbound message is addressed to a target server in a second computing cluster. The QSC proxy server initiates a QSC transport layer security (TLS) connection with an ingress controller in the second computing cluster, wherein the ingress controller comprises a QSC algorithm. The QSC proxy server transfers the message to the ingress controller via the QSC TLS connection, and the ingress controller routes the message to the target server in the second computing cluster via a non-QSC connection.

Another illustrative embodiment provides a system for post quantum secure network communication. The system comprises a storage device configured to store program instructions, and one or more processors operably connected to the storage device and configured to execute the program instructions to cause the system to: send, by a client in a first computing cluster, an outbound message to a quantum safe cryptographic (QSC) proxy server in the first computing cluster, wherein the outbound message is addressed to a target server in a second computing cluster; initiate, by the QSC proxy server, a QSC transport layer security (TLS) connection with an ingress controller in the second computing cluster, wherein the ingress controller comprises a QSC algorithm; transfer, by the QSC proxy server, the message to the ingress controller via the QSC TLS connection; and route, by the ingress controller, the message to the target server in the second computing cluster via a non-QSC connection.

Another illustrative embodiment provides a computer program product for post quantum secure network communication. The computer program product comprises a computer-readable storage medium having program instructions embodied therewith, the program instructions executable by a computer to cause the computer to perform the steps of: sending, by a client in a first computing cluster, an outbound message to a quantum safe cryptographic (QSC) proxy server in the first computing cluster, wherein the outbound message is addressed to a target server in a second computing cluster; initiating, by the QSC proxy server, a QSC transport layer security (TLS) connection with an ingress controller in the second computing cluster, wherein the ingress controller comprises a QSC algorithm; transferring, by the QSC proxy server, the message to the ingress controller via the QSC TLS connection; and routing, by the ingress controller, the message to the target server in the second computing cluster via a non-QSC connection.

DETAILED DESCRIPTION

Figure 1:
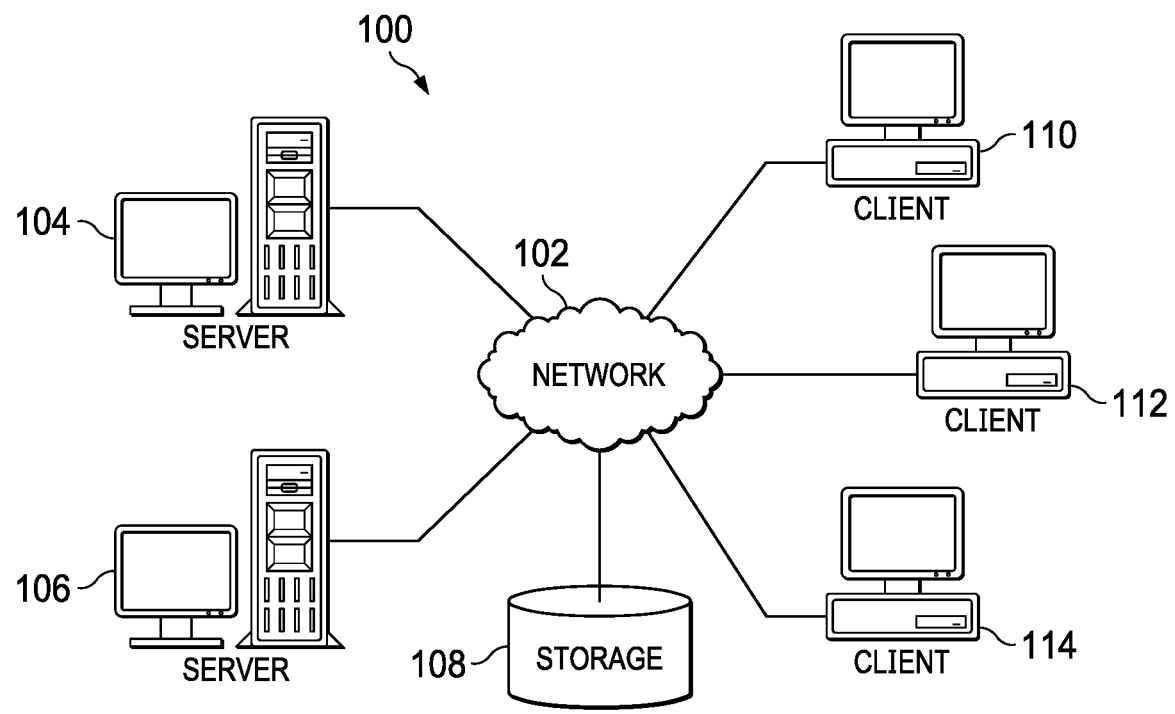
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 represents a container orchestration platform, such as Kubernetes® (a registered trademark of the Linux Foundation of San Francisco, California). However, it should be understood that Kubernetes is intended as an example architecture only and not as a limitation on illustrative embodiments. In other words, illustrative embodiments may utilize any type of container orchestration platform, architecture, or environment that provides automated deployment, scaling, and operations of application containers across host nodes.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more on-premises data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, smart glasses, smart appliances, gaming devices, kiosks, and the like, with wire or wireless communication links to network 102. Users of clients 110, 112, and 114 may utilize clients 110, 112, and 114 to access and utilize the services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of client devices, identifiers for a plurality of client device users, transaction identifiers corresponding to a plurality of user requests for services, a plurality of container checkpoints, and the like. Furthermore, storage 108 may store other types of data, such as authentication or credential data that may include usernames, passwords, and the like associated with client device users, application developers, and system operators, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
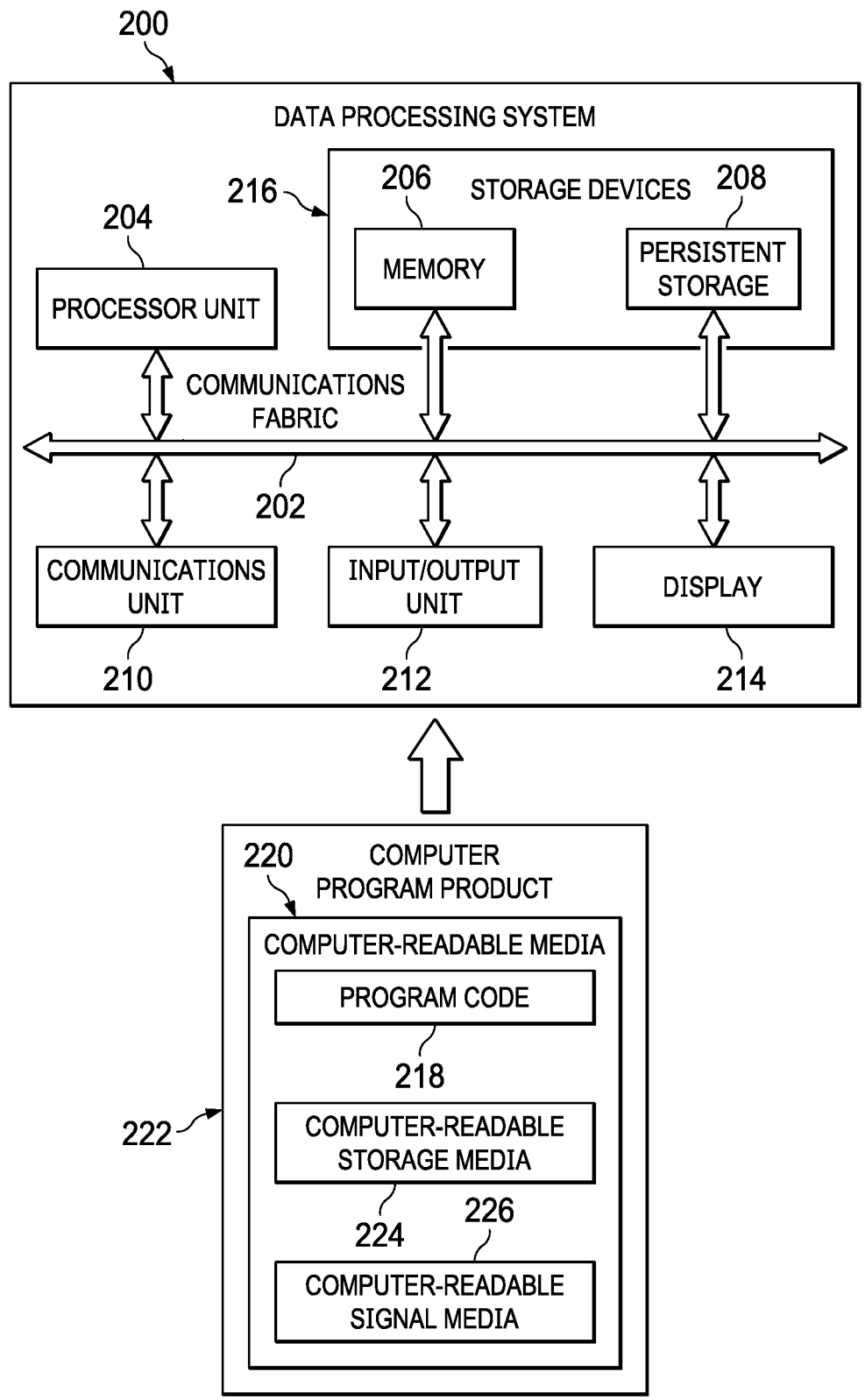
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the post quantum secure communications of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 218 is located in a functional form on computer-readable media 220 that is selectively removable and may be loaded onto or transferred to data processing system 200 for running by processor unit 204. Program code 218 and computer-readable media 220 form computer program product 222. In one example, computer-readable media 220 may be computer-readable storage media 224 or computer-readable signal media 226.

In these illustrative examples, computer-readable storage media 224 is a physical or tangible storage device used to store program code 218 rather than a medium that propagates or transmits program code 218. Computer-readable storage media 224 may include, for example, an optical or magnetic disc that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory that is connected to data processing system 200.

Alternatively, program code 218 may be transferred to data processing system 200 using computer-readable signal media 226. Computer-readable signal media 226 may be, for example, a propagated data signal containing program code 218. For example, computer-readable signal media 226 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 220" can be singular or plural. For example, program code 218 can be located in computer-readable media 220 in the form of a single storage device or system. In another example, program code 218 can be located in computer-readable media 220 that is distributed in multiple data processing systems. In other words, some instructions in program code 218 can be located in one data processing system while other instructions in program code 218 can be located in one or more other data processing systems. For example, a portion of program code 218 can be located in computer-readable media 220 in a server computer while another portion of program code 218 can be located in computer-readable media 220 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 218.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
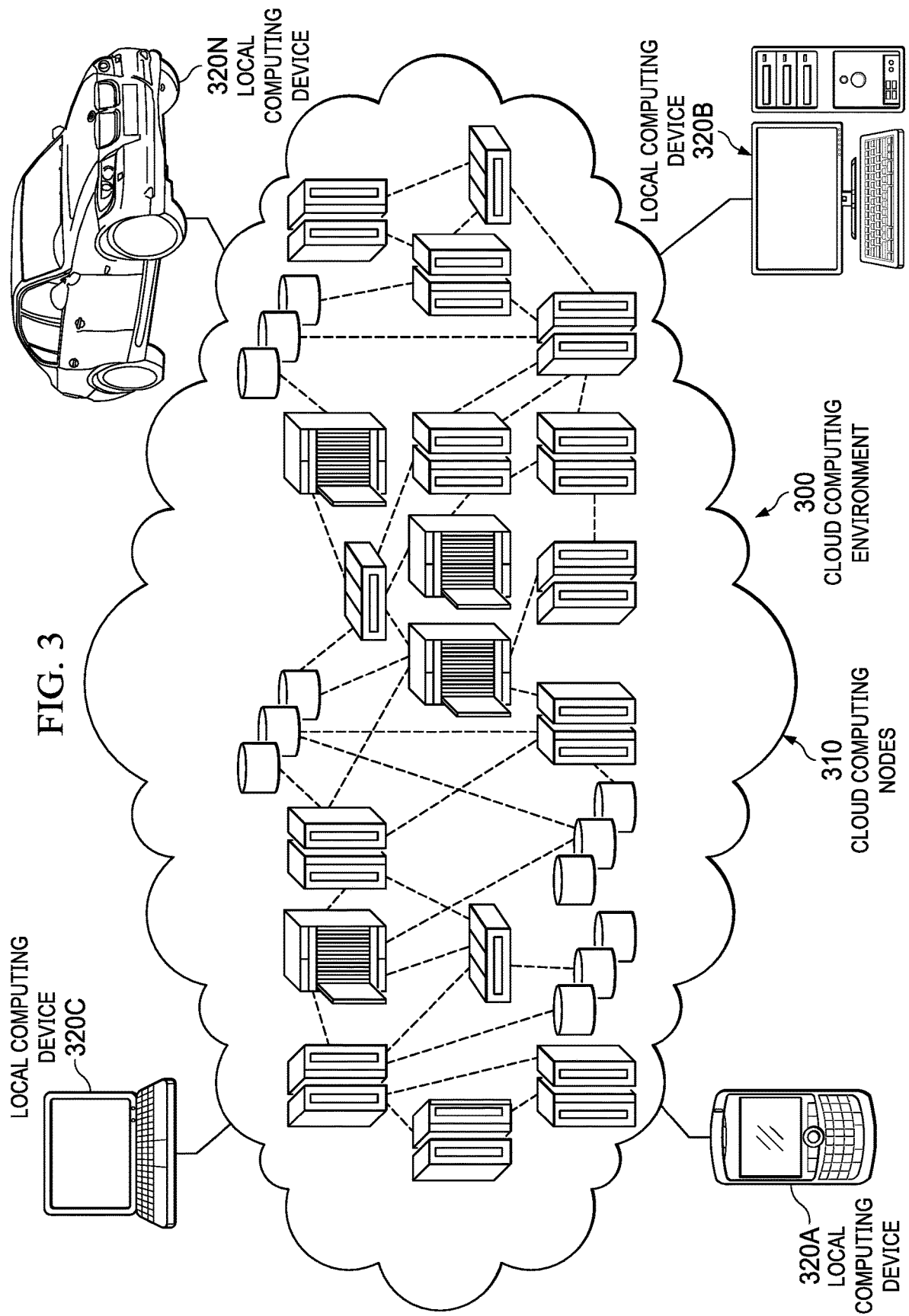
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110, 112, and 114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
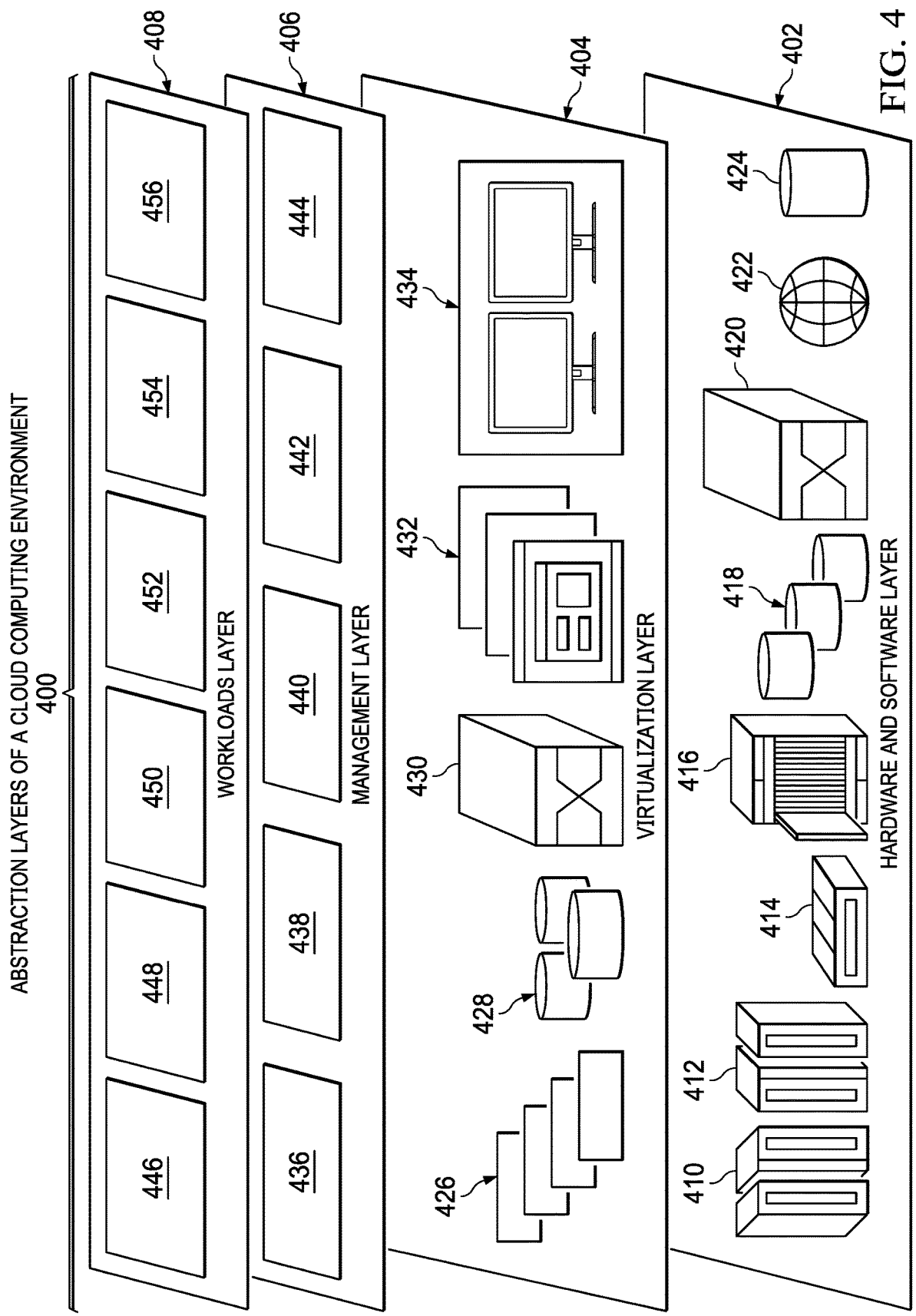
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and application migration management 456.

Kubernetes provide a platform for automating deployment, scaling, and operations of containers across clusters of host nodes. A host node is a machine, either physical or virtual, where containers (i.e., application workload) are deployed. A pod is a group of one or more containers, with shared storage and network resources, and a specification for how to run the containers. A pod's contents are always co-located and co-scheduled and run in a shared context. The host node hosts the pods that are the components of the application workload. Another example of containerized software is OpenShift®, which is built around containers orchestration and managed by Kubernetes.

The illustrative embodiments enable post quantum TLS support for workloads running in the cloud or on-premises without making any changes to the workload software stack. Since all software stacks have not yet adopted post quantum TLS, the illustrative embodiments introduce post quantum cryptography at the edge of the workloads to cover end-to-end external TLS connections between clusters as well as within the workload environment between microservices within a cluster using post quantum cryptography in the gRPC interface. The illustrative embodiments allow any workload deployed in a containerized environment such as Kubernetes or OpenShift to use post quantum hybrid TLS for external connections between clusters without any code change.

Figure 5:
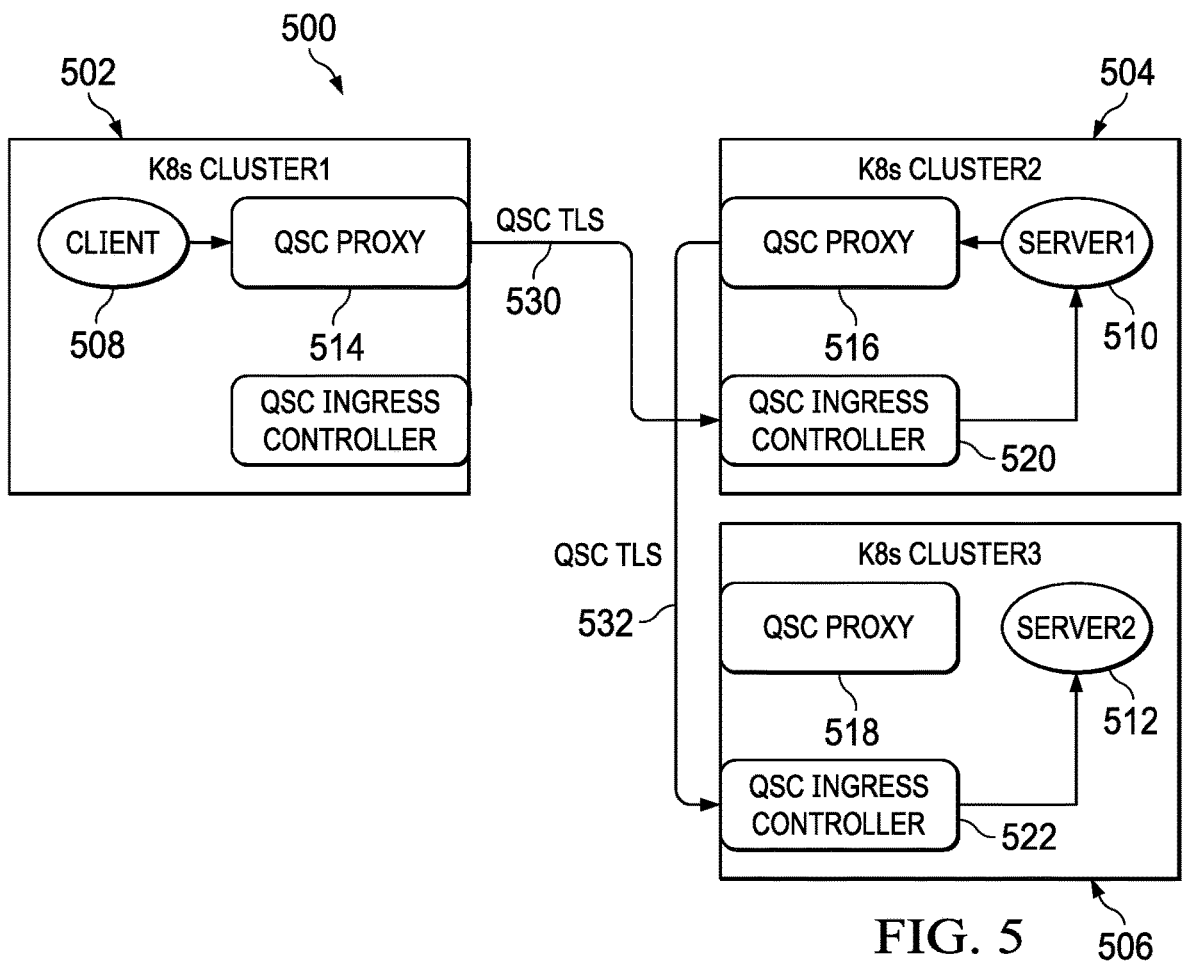
FIG. 5 depicts a diagram illustrating post quantum TLS communication between computing clusters in accordance with an illustrative embodiment.

FIG. 5 depicts a diagram illustrating post quantum TLS communication between computing clusters in accordance with an illustrative embodiment. Post quantum TLS communication system 500 may be implemented in a network of data processing systems, such as network data processing system 100 in FIG. 1, or a cloud computing environment, such as cloud computing environment 300 in FIG. 3.

The ingress controller in a Kubernetes (K8s) cluster and the router in an OpenShift cluster terminate TLS for incoming traffic into the cluster at the edge. The illustrative embodiments enable the ingress controller to use a QSC key encapsulation mechanism (KEM) algorithm (e.g., Kyber) for session key establishment in hybrid mode to address incoming network connections. The QSC hybrid mode combines current public key infrastructure (PKI) cryptography, such as ECC or RSA, with QSC algorithms such as Kyber algorithms, thereby strengthening existing PKI security.

The QSC proxy servers 514, 516, 518 are deployed in clusters 502, 504, 506 respectively, as outbound controllers. The purpose of adding a QSC proxy in a source cluster is to initiate the QSC TLS connection with the QSC Ingress controller of the target cluster, for outgoing data traffic.

QSC hybrid mode may support the Kyber algorithm with different parameter sets (key sizes) in combination with Elliptic-curve Diffie-Hellman (ECDH) to provide different levels of security. For example, Kyber512 has L1 security. Therefore, p256_kyber512 provides L1 security, which combines kyber512 with ECDH using the P256 curve. As another example, Kyber768 has L3 security. Therefore, p384_kyber786 provides L3 security, which combines kyber768 with ECDH using the P384 curve. In another example, Kyber1024 has L5 security. Therefore, p521_kyber1024 provides L5 security, which combines kyber1024 with ECDH using the P521 curve.

By addressing both inbound and outbound traffic, the external network traffic between clusters 502, 504, and 506 is enabled for QSC TLS communication. During egress of an outbound message, the illustrative embodiments enable a proxy server 514 with a QSC algorithm to be deployed as an application load balancer (ALB) within a cluster 502. Such QSC enabled proxy servers 514, 516, 518 are deployed in every cluster 502, 504, 506, allowing network connections on both ends to use QSC TLS.

Clients 508 and servers 510, 512 running within the clusters 502, 504, 506, respectively, can leverage QSC TLS without any code changes. When a client 508 within a cluster 502 generates an outbound message for another cluster, the client connection initiation goes to the QSC proxy server 514 acting as an ALB. QSC proxy may comprise an NginX or HAproxy server built with quantum safe enabled Open Secure Socket Layer (OpenSSL) and Open Quantum Safe (libOQS) modules which support Kyber quantum safe KEM algorithms.

Secure communication-applications and -middleware (e.g., gRPC) in general leverage some crypto- and network-library. An example for such a library provider is OpenSSL, which is in widespread use and essentially consists of the libcrypto and libssl libraries. The former provides the crypto algorithm, and the latter covers how the crypto algorithms are used in network connections. The combination of the two allows, for example, establishing a TLS connection. Projects like Open Quantum Safe provide modifications to OpenSSL to not only make QSC-algorithms available, but also implement the usage of these algorithms for secure network connections. Communication-applications and -middleware can use the resulting modified OpenSSL libraries seamlessly be to establish QSC-TLS connections by specifying the use of QSC-algorithms in place of RSA or ECC algorithms.

The QSC proxy server 514 then initiates a QSC TLS connection 530 with a QSC ingress controller 520 in a second computing cluster 504 where the target server 510 is running. The ingress controller 520 may also be built with quantum safe enabled OpenSSL and libOQS modules.

The QSC TLS connection 530 terminates at the QSC ingress controller 520, and the message is then routed to the target server 510 over a non-QSC connection. The target server 510 sends a response to the client 508 on the QSC TLS connection that the client initiated. The whole exchange, including the session key, are protected by a QSC algorithm in hybrid mode.

Server 510 may also initiate a connection to QSC proxy server 516 in computing cluster 504, which establishes a new QSC TLS connection 532 with ingress controller 522 in computing cluster 506. Ingress controller 522 then routes the message from server 510 to server 512.

Figure 6:
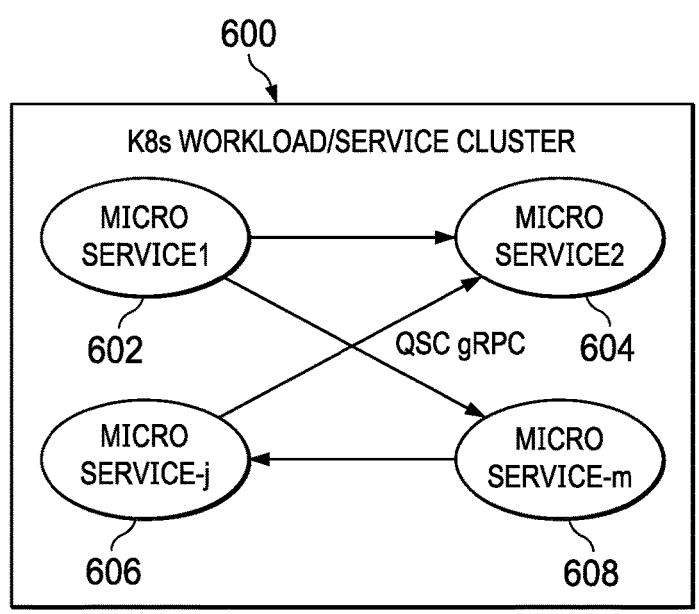
FIG. 6 depicts a diagram illustrating post quantum communication between microservices in the same computing cluster in accordance with an illustrative embodiment.

FIG. 6 depicts a diagram illustrating post quantum communication between microservices in the same computing cluster in accordance with an illustrative embodiment. The process shown in FIG. 6 may be implemented in computing clusters 502, 504, 506 in FIG. 5.

Microservices 602, 604, 606, 608 within the same cluster 600 use gRPC (Remote Procedure Call) to communicate with each other. Remote procedure calls are a form of inter-process communication that allow a program to request service from another program located in another address space within a network. Remote procedure calls operate on a client-server model in which the requesting program or microservice is the client, and the service-providing program or microservice is the server. gPRC generates client-serving bindings and uses TLS for authentication and to encrypt network connections between microservices.

The illustrative embodiments enable gRPC with a post quantum algorithm in hybrid mode, which allows the TLS network communication to be post quantum safe within the clusters. As with the QSC TLS communication between clusters, the workload running in the microservices 602, 604, 606, 608 do not have to change code. Only gRPC has to be modified to support the QSC algorithm. This modification can be achieved by using a QSC-enabled OpenSSL library when building the gRPC.

Thus, illustrative embodiments provide one or more technical solutions that overcome a technical problem with implementing post quantum secure communication in existing systems without the need to make any changes to application/workload software. As a result, these one or more technical solutions provide a technical effect and practical application in the field of secure post quantum communication.

Figure 7:
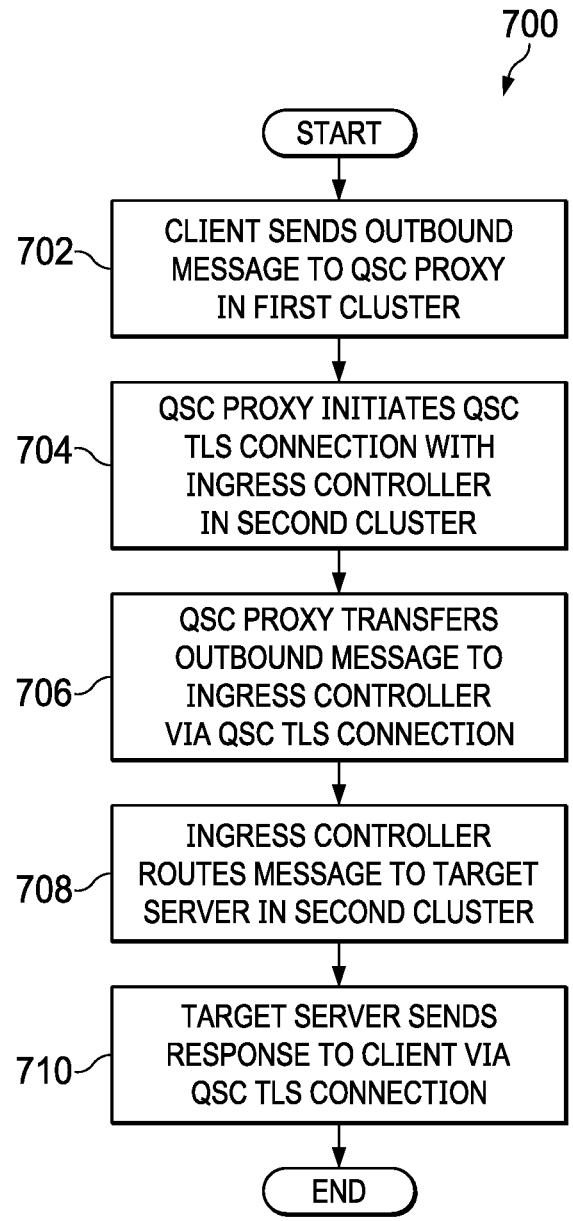
FIG. 7 depicts a flowchart illustrating a process for post quantum TLS communication between computing clusters in accordance with an illustrative embodiment.

FIG. 7 depicts a flowchart illustrating a process for post quantum TLS communication between computing clusters in accordance with an illustrative embodiment. The process shown in FIG. 7 may be implemented in a computer, such as, for example, server 104 in FIG. 1, data processing system 200 in FIG. 2, a cloud computing node of cloud computing nodes 310 in FIG. 3, or post quantum TLS communication system 500 in FIG. 5.

Process 700 beings by a client in a first computing cluster sending an outbound message to a quantum safe cryptographic (QSC) proxy server in the first computing cluster, wherein the outbound message is addressed to a target server in a second computing cluster (step 702). The QSC proxy server may act as an application load balancer with the first cluster. The QSC server may comprise a Nginx or HAProxy server.

The QSC proxy server initiates a QSC transport layer security (TLS) connection with an ingress controller in the second computing cluster, wherein the ingress controller comprises a QSC algorithm (step 704). For example, the ingress controller may comprise a Kyber KEM algorithm. Initialing the QSC TLS connection may comprise using a KEM algorithm in combination with elliptical-curve cryptography (ECC) or Rivest-Shamir-Adleman (RSA) cryptography. The QSC proxy server then transfers the message to the ingress controller via the QSC TLS connection (step 706).

The ingress controller then routes the message to the target server in the second computing cluster via a non-QSC connection (step 708). The target server may have a response to the client via the same QSC TLS connection (step 710). Process 700 then ends.

Thus, illustrative embodiments of the present invention provide a computer-implemented method, computer system, and computer program product for migrating a set of applications corresponding to a customer entity from a cloud application platform to a container orchestration platform while maintaining continuous liveness and integrity of the set of customer entity applications during the migration process. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for post quantum secure network communication, the method comprising:
using a number of processors to perform the steps of:
sending, by a client in a first computing cluster, an outbound message to a quantum safe cryptographic (QSC) proxy server in the first computing cluster, wherein the outbound message is addressed to a target server in a second computing cluster;
initiating, by the QSC proxy server, a hybrid QSC transport layer security (TLS) connection with an ingress controller in the second computing cluster, wherein the ingress controller uses a QSC key encapsulation mechanism algorithm for session key establishment in hybrid mode;
transferring, by the QSC proxy server, the message to the ingress controller via the QSC TLS connection;
routing, by the ingress controller, the message to the target server in the second computing cluster via a non-QSC connection; and
sending, by the target server, a response to the client via the QSC TLS connection.

2. The method of claim 1, wherein the QSC proxy server acts as an application load balancer with the first cluster.

3. The method of claim 1, wherein the QSC server comprises a Nginx or HAProxy server.

4. The method of claim 1, wherein initiating the QSC TLS connection comprises using the key encapsulation mechanism algorithm in combination with elliptical-curve cryptography or Rivest-Shamir-Adleman cryptography.

5. The method of claim 1, wherein the ingress controller comprises a Kyber algorithm.

6. The method of claim 1, wherein communication between microservices within the first and second computing clusters employ remote procedure calls comprising a QSC algorithm.

7. A system for post quantum secure network communication, the system comprising:
a storage device configured to store program instructions; and
one or more processors operably connected to the storage device and configured to execute the program instructions to cause the system to:
send, by a client in a first computing cluster, an outbound message to a quantum safe cryptographic (QSC) proxy server in the first computing cluster, wherein the outbound message is addressed to a target server in a second computing cluster;
initiate, by the QSC proxy server, a hybrid QSC transport layer security (TLS) connection with an ingress controller in the second computing cluster, wherein the ingress controller uses a QSC key encapsulation mechanism algorithm for session key establishment in hybrid mode;
transfer, by the QSC proxy server, the message to the ingress controller via the QSC TLS connection;

route, by the ingress controller, the message to the target server in the second computing cluster via a non-QSC connection; and send, by the target server, a response to the client via the QSC TLS connection.

8. The system of claim 7, wherein the QSC proxy server acts as an application load balancer with the first cluster.

9. The system of claim 7, wherein the QSC server comprises a Nginx or HAProxy server.

10. The system of claim 7, wherein initiating the QSC TLS connection comprises using the key encapsulation mechanism algorithm in combination with elliptical-curve cryptography or Rivest-Shamir-Adleman cryptography.

11. The system of claim 7, wherein communication between microservices within the first and second computing clusters employ remote procedure calls comprising a QSC algorithm.

12. A computer program product for post quantum secure network communication, the computer program product comprising:

a computer-readable storage medium having program instructions embodied therewith, the program instructions executable by a computer to cause the computer to perform the steps of:

sending, by a client in a first computing cluster, an outbound message to a quantum safe cryptographic (QSC) proxy server in the first computing cluster, wherein the outbound message is addressed to a target server in a second computing cluster;

initiating, by the QSC proxy server, a hybrid QSC transport layer security (TLS) connection with an ingress controller in the second computing cluster, wherein the ingress controller uses a QSC key encapsulation mechanism algorithm for session key establishment in hybrid mode;

transferring, by the QSC proxy server, the message to the ingress controller via the QSC TLS connection;

routing, by the ingress controller, the message to the target server in the second computing cluster via a non-QSC connection; and sending, by the target server, a response to the client via the QSC TLS connection.

13. The computer program product of claim 12, wherein the QSC proxy server acts as an application load balancer with the first cluster.

14. The computer program product of claim 12, wherein the QSC server comprises a Nginx or HAProxy server.

15. The computer program product of claim 12, wherein initiating the QSC TLS connection comprises using the key encapsulation mechanism algorithm in combination with elliptical-curve cryptography or Rivest-Shamir-Adleman cryptography.

16. The computer program product of claim 12, wherein the ingress controller comprises a Kyber algorithm.

17. The computer program product of claim 12, wherein communication between microservices within the first and second computing clusters employ remote procedure calls comprising a QSC algorithm.

* * * * *